United States Patent [19]

Milgram

[11] 4,303,351

[45] Dec. 1, 1981

[54] OIL SPILL BARRIERS

[75] Inventor: Jerome H. Milgram, Cambridge, Mass.

[73] Assignee: Offshore Devices, Inc., Peabody, Mass.

[21] Appl. No.: 119,298

[22] Filed: Feb. 7, 1980

[51] Int. Cl.³ ............................................. E02B 15/04
[52] U.S. Cl. ........................................ 405/66; 405/72
[58] Field of Search .................................. 405/63-72; 210/242, DIG. 25

[56] References Cited

U.S. PATENT DOCUMENTS

| | | | |
|---|---|---|---|
| 3,686,870 | 8/1972 | Blomberg | 405/72 X |
| 3,740,955 | 6/1973 | Fossberg | 405/67 |
| 3,943,720 | 3/1976 | Milgram | 405/63 |
| 4,059,962 | 11/1977 | Milgram | 405/72 |

FOREIGN PATENT DOCUMENTS 2009655  2/1970  France ................................. 405/64

Primary Examiner—David H. Corbin
Attorney, Agent, or Firm—Maurice R. Boiteau

[57] ABSTRACT

There is disclosed in the present application, a barrier comprising a curtain fitted to stiffening struts at regular intervals along its length and provided with rigid flotation in the form of blocks of foam secured to the rearward side of the curtain. The blocks of foam are hinged so that, in use, they are located on the upper half of the curtain, but for stowing, the blocks are extended over substantially the entire width of the curtain so as to reduce the required stowage space.

10 Claims, 11 Drawing Figures

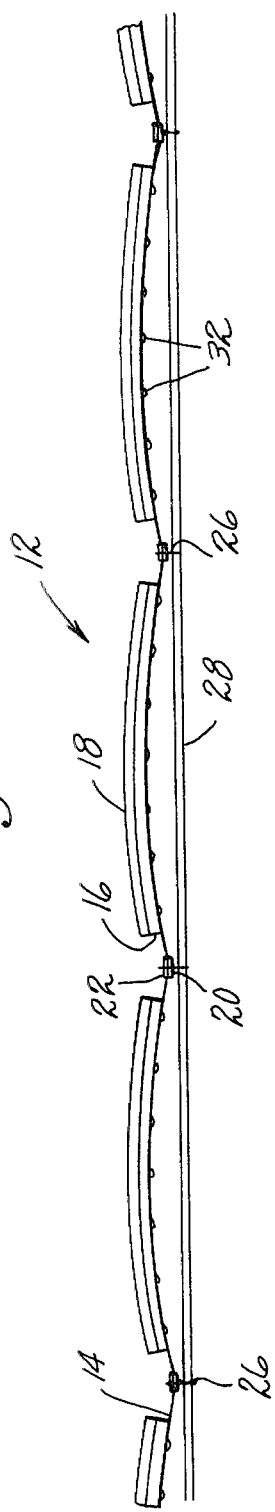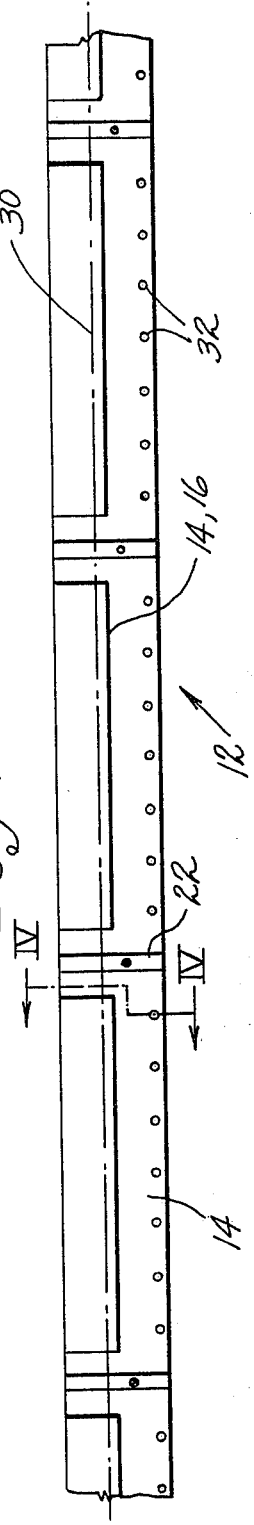

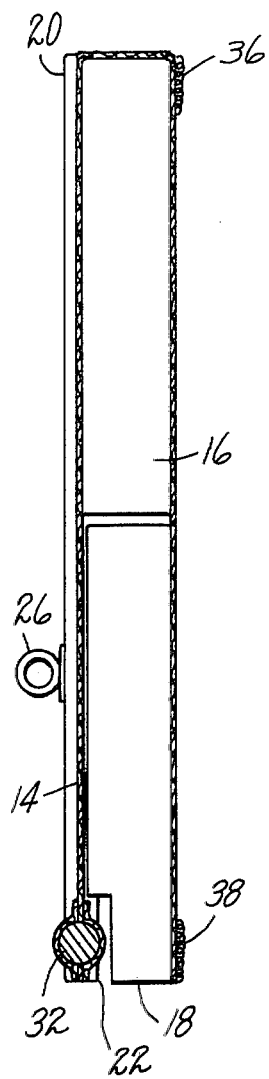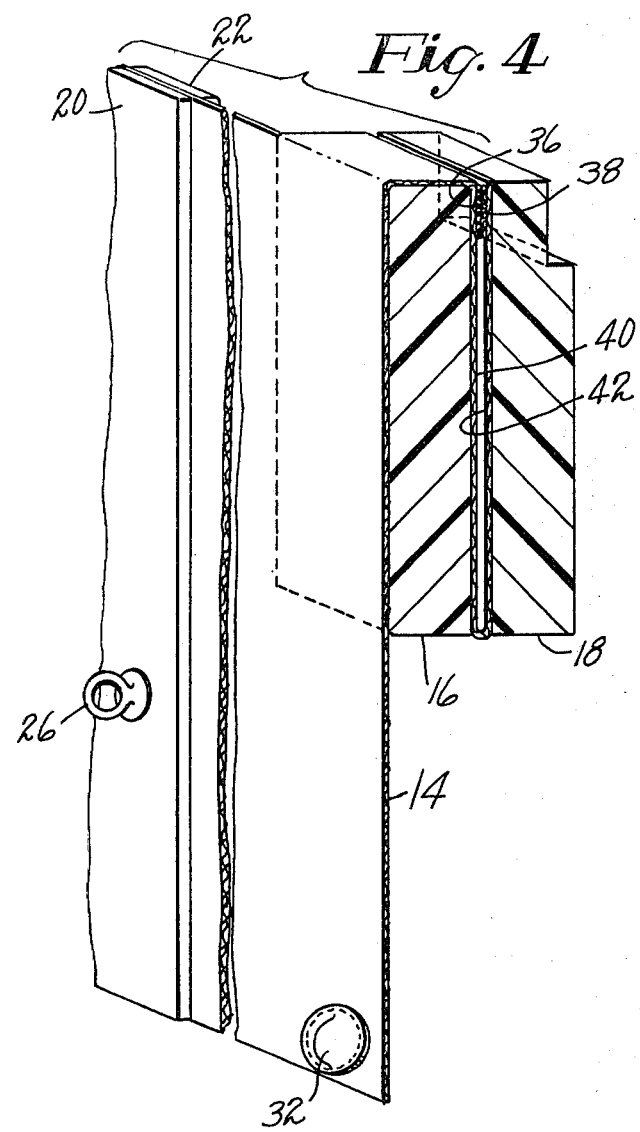

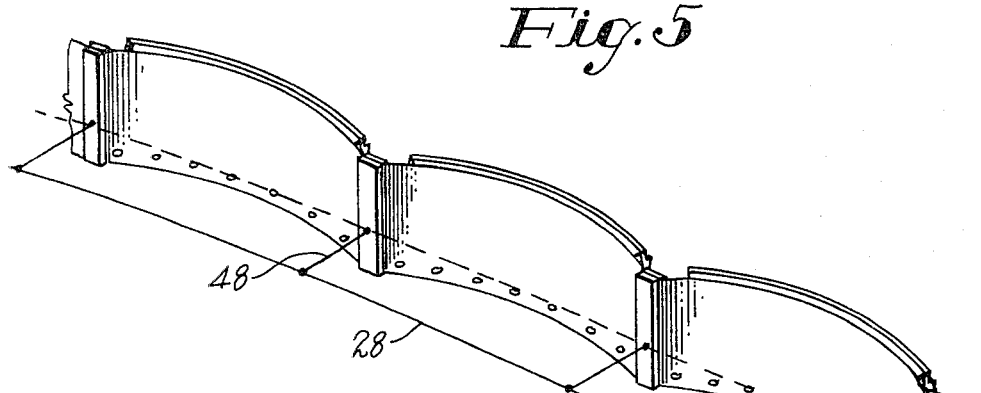
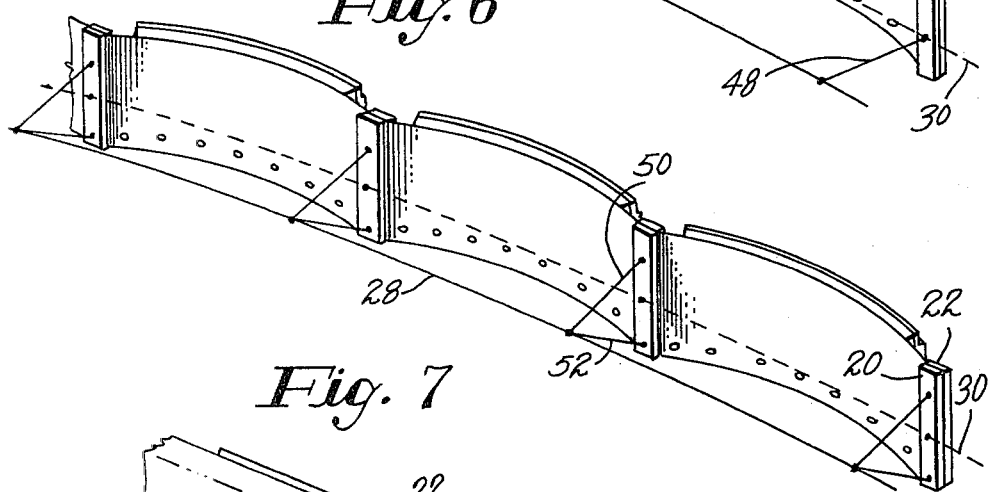
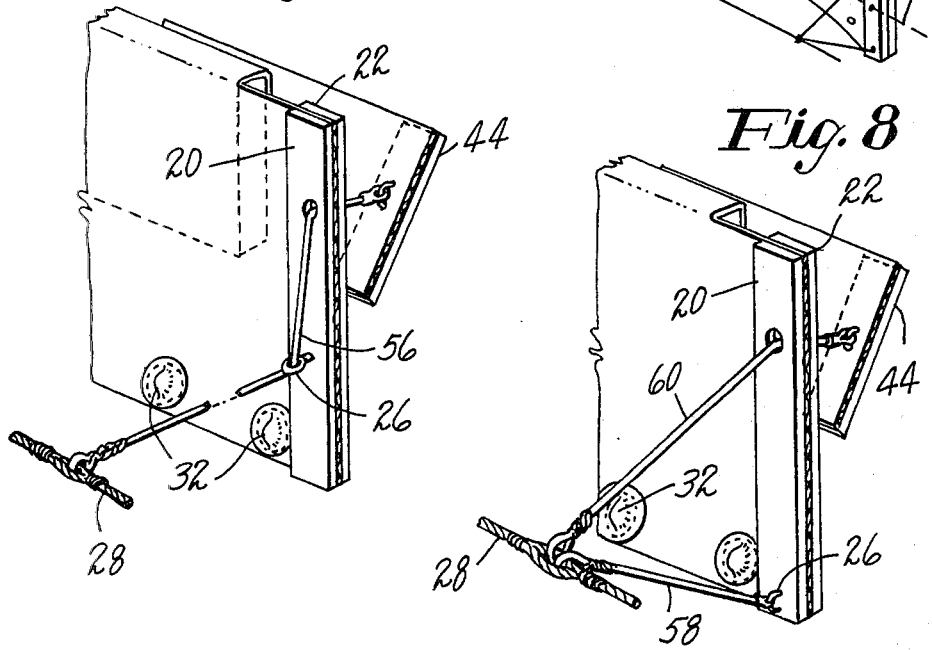

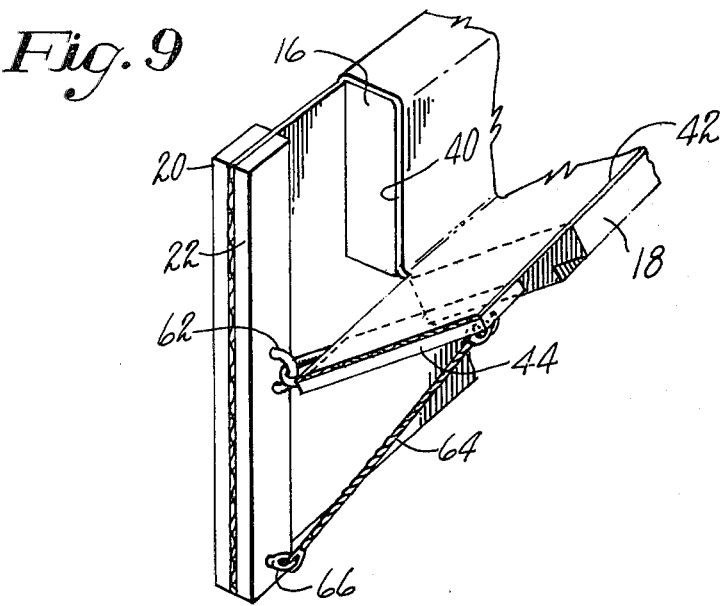
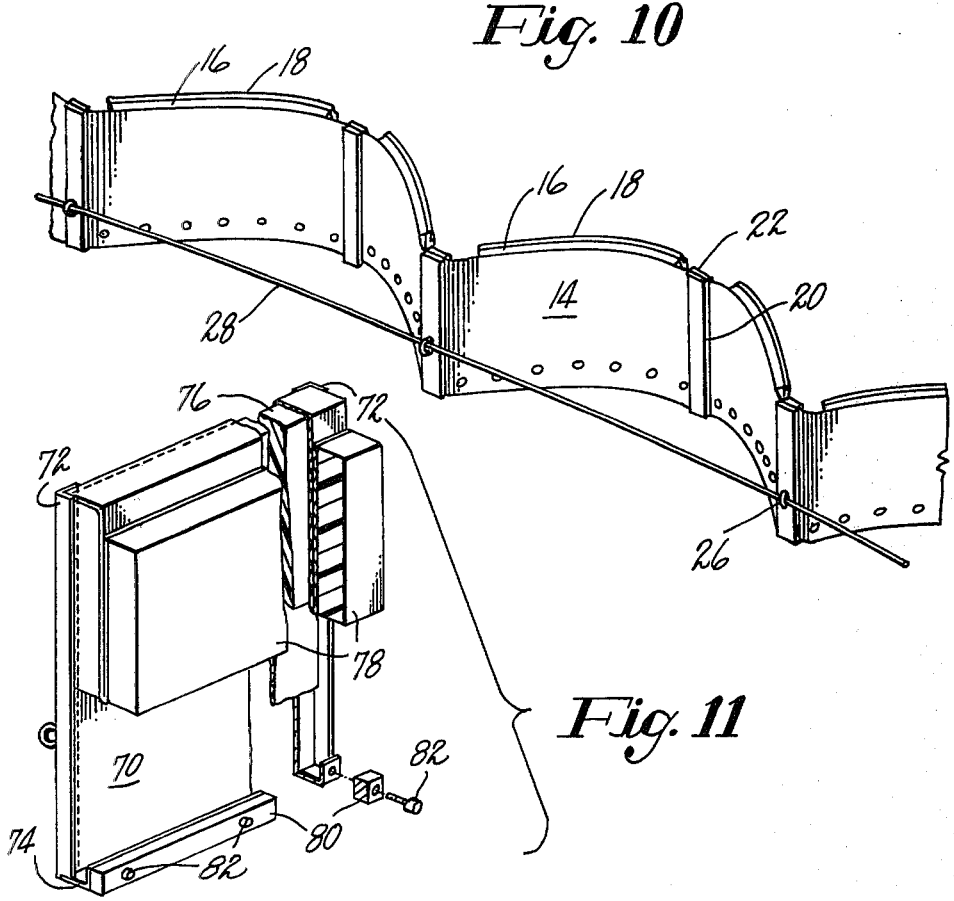

OIL SPILL BARRIERS

The present invention relates generally to barriers for collecting, controlling and/or sweeping oil spills on water and more particularly to such barriers which include rigid flotation.

A common type of oil recovery barrier or boom includes a curtain maintained afloat in a generally vertical position by inflatable or rigid foam flotation. Effective operation in waves and currents requires adequate weight stability and reserve buoyancy in relation to the height of the current. The reserve buoyancy needs to be on the order of four times the barrier weight so that the volume occupied by the flotation material can be substantial. In the operating condition, this flotation cannot be uniformly distributed over the curtain, but must be over just its upper portion. In the case where the flotation is provided by a rigid material on the upper part of the curtain the volume of a package of barriers to be delivered to a spill site is usually much greater than the actual volume of the barriers since the package will usually include relatively large voids between the lower edge of the curtain and the flotation units.

The roll stability of a barrier including rigid stiffening struts is improved by locating the flotation in an outrigger configuration, but this tends to further reduce packaging efficiency when rigid flotation is used. To improve the packaging efficiency of barriers, inflatable flotation elements, deflated when packaged, and gas inflated while being deployed, are often used. However, inflatable elements are vulnerable to punctures and tears and the need for inflation systems necessarily decreases reliability and adds weight in non-optimum locations. In addition, the inflation system adds substantially to the cost.

It is accordingly an object of the present invention to improve the reliability and durability of oil spill barrier assemblies.

Another object is to improve the packaging efficiency of barrier assemblies including rigid flotation elements.

A further object is to improve the roll stability of barrier assemblies without increasing their stowing volume.

A still further object is to achieve the foregoing objects while, at the same time, reducing the cost of manufacture.

In the achievement of the foregoing objects, a feature of the invention relates to the mounting of flotation units on the curtain so that in operative condition, the flotation units are positioned on essentially the upper half of the curtain, thus allowing the lower half of the curtain to extend below troughs of waves on the surface of the water to prevent the escape of floating oil beneath the lower edge of the curtain. According to a related feature of the invention, the flotation units are hinged along a longitudinal line approximately midway up the curtain so that they may be disposed in flattened condition across the entire height of the curtain for greater compactness in packaging.

Another feature of the invention is directed to the provision of greater roll stability, equal to that provided by outrigger flotation. For this purpose, the barrier is deployed in a zigzag pattern by including a tension line interconnected to the curtain only at the ends of alternate panels leaving intermediate unconnected panel junctions free to trail the attached points.

The foregoing objects and features will be more fully understood from the following detailed description of an illustrative embodiment taken in connection with the accompanying drawings in which:

FIG. 1 is a plan view of a barrier assembly according to the present invention with various parts shown in operative positions;

FIG. 2 is a rear view of the barrier assembly depicted in FIG. 1;

FIG. 3 is a view in vertical cross-section of the barrier according to the present invention with the parts shown in the relative positions they occupy for packaging;

FIG. 4 is a view in cross-section and on an enlarged scale taken along the line III—III of FIG. 2 showing the various parts of the barrier assembly in operative positions;

FIG. 5 is a view in perspective of the barrier assembly of FIGS. 1 and 2 but illustrating a single barrier bridle arrangement;

FIG. 6 is a view in perspective similar to FIG. 5 but showing a double bridle arrangement;

FIG. 7 is a detail view in perspective and partly in cross-section showing an alternative single bridle arrangement;

FIG. 8 is a view similar to FIG. 7 showing an alternative double bridle arrangement;

FIG. 9 is a detail view in perspective of a barrier assembly including a flotation unit retained in operative position by a line;

FIG. 10 is a view in perspective showing the deployment of the barrier of FIGS. 1 and 2 employing a bridle arrangement in which points on alternate panels are connected to a tension line; and FIG. 11 is a fragmentary view in perspective showing an alternative ballast and stiffener arrangement.

Turning now to the drawings, there is shown particularly in FIGS. 1 to 4 inclusive, a barrier assembly 12 comprising a curtain 14 of fabric coated with a suitable waterproofing formulation such as Buna-n or polyurerthane and adapted to be maintained in generally upright position at the surface of the water by upper and lower flotation units 16 and 18 respectively. The curtain is vertically stiffened at substantially regular intervals, typically about every seven feet by front and rear struts 20 and 22 which sandwich the curtain between them by being connected by screws, not shown, passing through suitable openings in the curtain. The struts are appropriately manufactured of a relatively stiff plastic, wood or metal suitable for resisting the corrosive effects of sea water.

As best seen in FIG. 4, an eye 26 is secured to each strut. Each eye 26 is connected to the related struts by means of a stem (not shown) which passes through both struts of the pair to be engaged by a nut on the rear of the strut 22. In a typical installation, a tension member in the form of a braided line 28 is attached to the eyes 26 and thus resists substantially the entire stress of the oil gathering operation rather than subjecting the curtain 14 to the full tension of a sweeping operation, for example. The eyes 26, as seen from FIG. 4 are below the level of the bottom of the flotation units 16 and 18 and accordingly, the line 28 which is attached to the eyes 26 is below the water level indicated in FIG. 2 by a dot and dash line 30. In addition to the relative placement of the flotation and the location of the eyes 26 for the line 28, a series of ballast weights 32 along the lower edge of the curtain 14 assists in maintaining the curtain in upright position in the water.

In the embodiment of the present invention, the lower flotation unit 18, shown in stowing position in FIG. 3 for purposes of packing, is held in the operative position depicted in FIG. 4 by strips of "Velcro", a commercially available product consisting of a strip of loops and a strip of hooks which interlock to provide a form of adhesion between the two strips. Thus, from the stowing position depicted in FIG. 3, the lower flotation unit is folded up so that its strip 38 engages and is secured to the strip 36 affixed to the upper edge of the upper flotation 16. Alternatively, the buoyant force of the water on the flotation unit 18 urges it into a nearly vertical position so that the use of the "Velcro" may not be necessary. The hinged two-part flotation arrangement thus permits a relatively thin cross-section consisting of the curtain 14 and a single layer of flotation units 16 and 18 shown in FIG. 3 to be folded over on itself in compact layers for stowing for transportation. However, when deployed at the oil spill site, the lower flotation unit 18 folds up to the position of FIG. 4, due to the buoyant force of the water on it. The adjacent surfaces of the flotation units 16 and 18 are covered respectively by sheaths 40 and 42 which cover their entire rearward surface, provide a hinge about which the flotation unit 18 is folded upwardly and also assist in protecting the foam of which the flotation units are made, against accidental injury.

As best seen in FIG. 9, an auxiliary strut 44 may be employed to improve the positioning of the flotation unit 18. The auxiliary strut 44 is conveniently pivoted on the rearward strut 22. For improved performance in currents and waves and for greater convenience in deploying the barrier assembly, it may be interconnected to the line 28 by means of various bridle arrangements which will hereinafter be described. Before proceeding to a description of various bridling arrangements associated with the auxiliary strut 44, interconnections directly between the curtain 14 and the tension line 28 will now be described with reference to the showings of FIGS. 5, 6 and 10. There is shown in FIG. 5, a series of single bridles 38 extending between the tension line 28 and connection points on the front stiffeners 20, typically at the eyes 26 such as is shown in FIGS. 3 and 4. Use of a ring bolt instead of an eyebolt 26 eliminates chafing between bridle and bolt. In order to gain greater roll stability, the arrangement depicted in FIG. 6 may be employed, consisting of upper and lower bridles 50 and 52 respectively interconnecting points on the front stiffeners 20 above and below the level of the center of horizontal hydrodynamic force on the curtain. Another arrangement which provides additional roll stability is shown in FIG. 10 and consists essentially of attaching the tension line 28 directly to alternate front stiffeners 20, thereby causing the curtain 14 to be disposed rearwardly between attachment points as the barrier is being towed by work boats pulling on the ends of the line 28 in performing a sweeping operation or when the barrier is moored in a current. According to other arrangements, the alternate front stiffeners 20 may be connected to the line 28 either by single or double bridles comparable to those shown in FIGS. 5 and 6. The tendency of the barrier to roll and become inclined to the vertical due to moments imposed by waves and currents is reduced by the zigzag configuration shown in FIG. 10, which acts in part like outrigger flotation, increasing the resistance to rolling.

One of the arrangements for deploying a barrier assembly including an auxiliary strut 44 is depicted in FIG. 7 and includes a single operating bridle 56 which is connected at one end to the auxiliary strut 44 and passes through a suitably located opening in the stiffeners 20 and 22, then through the eye 26 and extends forwardly to an attachment to the tension line 28. In the various arrangements including an auxiliary strut 44, it will be appreciated that the back of the lower flotation unit 18 is preferably stiffened by a longitudinal member of plastic or metal. An alternative construction to improve the roll stability while retaining advantageous operating characteristics, includes a lower bridle 58 as shown in FIG. 8 and an upper operating bridle 60, the operating bridle being secured at one end to the auxiliary strut 44, passing through a suitable opening in the stiffeners 20 and 22 to a connection with a ring which is also connected to the forward end of the bridle 58 having its other end secured to the eye 26. It is seen that the bridle arrangements depicted in FIGS. 7 and 8 assist in moving the flotation unit 18 into operative position as the barrier assembly is being deployed. In FIG. 9, there is shown a typical pivotal mounting for an auxiliary strut. In the arrangement of FIG. 9, a guy line 64 extends from an eye at the distal end of the auxiliary strut 44 to an eye 66 mounted below the water line on the stiffener 22. It is thus seen that with the arrangement in FIG. 9, the flotation unit 18 may be oriented as an outrigger flotation for greater roll stability of the curtain 14 at the same time that the flotation unit 18 is easily conformed to the position of FIG. 3 for stowing and yet reaches the operative position depicted in FIG. 9 automatically upon deployment of the barrier in the water.

An alternative embodiment of the invention is shown in FIG. 11 and includes for each panel of a curtain 70, a frame comprising vertical stiffeners 72 rigidly secured to a horizontal member 74. Horizontal flexibility of the curtain is provided by a narrow stip of curtain between adjacent frames, Upper and lower flotations 76 and 78 respectively, are shown in operating positions, but the alternative embodiments is designed to provide nesting for the lower flotation in its stowing position which is comparable to that shown for the flotation 16 and 18 in FIG. 3. In the stowing position, the lower flotation 78 rests against the lower portion of the curtain 70 and is nested by the horizontal member 74 and a ballast bar 80 which is secured to the member 74 by screws 82 and is a substitute for the ballast weights 32 seen in the other figures. The alternative embodiment of FIG. 11 includes frame members which replace the stiffening struts 20 and 22 shown in FIGS. 1 to 10 but the construction just described lends itself equally well to the various bridling arrangements depicted in FIGS. 5 to 10, as will be readily understood.

It is seen from the foregoing description of alternative embodiments that the present invention is adapted to numerous modifications within its scope. It is therefore not intended that the embodiments described above be regarded as limitations of the breadth of the invention, but rather that the scope be interpreted in terms of the appended claims.

Having thus disclosed my invention, what I claim as new and desire to secure by Letters Patent of the United States is:

1. A barrier assembly comprising an elongated curtain adapted to be deployed on the water and having an oil spill contacting front side and a rear side, ballast means on the lower margin of the curtain, solid flotation means mounted on the rear side only for maintaining the curtain transversely generally erect in the water with its lower edge below the surface of the water including pairs of flotation units each consisting of an upper unit fixedly mounted on the curtain, a lower unit and a median horizontal hinge about which the lower unit is movable between an upper operative position in which it is located rearwardly and generally at the height of the upper unit and a lower compact stowing position in which the lower unit is generally coplanar with the upper unit and in which the two parts of the flotation means together are coextensive with a substantial part of the curtain width.

2. A barrier assembly according to claim 1 further characterized in that the foam of the flotation units is of the closed cell type.

3. A barrier assembly according to claim 1 further comprising means for retaining the movable portion of the flotation means in its upper position.

4. A barrier assembly according to claim 1 further characterized in that the curtain is divided into a series of panels separated by upright spaced apart stiffeners and that a flotation means is mounted for each panel on the rear side of the curtain.

5. A barrier assembly according to claim 4 further characterized in that the flotation means comprises an upper foam flotation unit affixed to the rear side of the curtain and a lower foam flotation unit hingedly connected to the upper unit for each panel.

6. A barrier assembly according to claim 5 further comprising a tension line and a bridle interconnected between the tension line and at least some of the stiffeners on the curtain.

7. A barrier assembly according to claim 5 further comprising a tension line and a bridle at each stiffener extending between the tension line and the lower flotation unit, each bridle passing through an opening in the curtain and being connected to the lower foam flotation unit, thereby automatically moving and retaining the lower flotation unit into operative position when the bridle is placed under tension during barrier deployment.

8. A barrier assembly according to claim 1 further characterized in that each lower flotation unit is oriented in an outrigger position and further comprising means including a guy line connected to the lower flotation unit for retaining each lower unit in its outrigger position.

9. A barrier assembly comprising an elongated curtain having an oil spill contacting front side and a rear side and adapted to be deployed on the water, rigid stiffening struts secured to and dividing the curtain into a series of panels, solid flotation means mounted on the rear side only of the curtain and including pairs of flotation units, each pair mounted between stiffening struts and consisting of an upper unit fixed to the curtain, a lower unit and a hinge by which the lower unit is connected to the upper unit and about which it is movable with respect to the upper unit between a stowing position in which it is generally coplanar with the upper unit and an operative position in which it is deployed rearwardly and generally at the height of the upper unit, ballast means connected to the lower margin of the curtain between the struts for maintaining the curtain generally erect in the water and a tension carrying line connected only to alternate struts, thereby causing unattached struts to trail the tension line allowing the curtain and its flotation and ballast means to form pockets behind the tension line and increasing roll stability of the barrier against overturning forces and moments of waves and currents.

10. A barrier assembly according to claim 9 further comprising bridle lines extending between attachment points on the struts and the tension line.

* * * * *